US009715151B2

(12) United States Patent
Jung et al.

(10) Patent No.: US 9,715,151 B2
(45) Date of Patent: Jul. 25, 2017

(54) LIQUID CRYSTAL DISPLAY

(75) Inventors: Mee Hye Jung, Suwon-si (KR); Kook Hyun Choi, Seoul (KR); Hye Seok Na, Suwon-si (KR); Dong Gyu Kim, Yongin-si (KR); Young Hoon Yoo, Asan-si (KR); Woo Sung Sohn, Seoul (KR); Sung Hoon Kim, Seoul (KR)

(73) Assignees: SAMSUNG ELECTRONICS CO., LTD., Gyeonggi-Do (KR); SAMSUNG DISPLAY CO., LTD., Gyeonggi-Do (KR)

( * ) Notice: Subject to any disclaimer, the term of this patent is extended or adjusted under 35 U.S.C. 154(b) by 1505 days.

(21) Appl. No.: 13/241,477

(22) Filed: Sep. 23, 2011

(65) Prior Publication Data
US 2012/0194774 A1    Aug. 2, 2012

(30) Foreign Application Priority Data
Jan. 28, 2011    (KR) .................. 10-2011-0008627

(51) Int. Cl.
*G02F 1/1343*    (2006.01)
*G02F 1/139*    (2006.01)
(Continued)

(52) U.S. Cl.
CPC ...... *G02F 1/134363* (2013.01); *G02F 1/1395* (2013.01); *G02F 1/13624* (2013.01); *G02F 2001/13606* (2013.01); *G02F 2201/40* (2013.01)

(58) Field of Classification Search
None
See application file for complete search history.

(56) References Cited

U.S. PATENT DOCUMENTS 7,110,076 B2    9/2006   Shimizu et al.
7,349,051 B2    3/2008   Kim et al.
(Continued)

FOREIGN PATENT DOCUMENTS

CN    101609235 A    12/2009
CN    101893796 A    11/2010
(Continued)

OTHER PUBLICATIONS

Extended European Search Report for application No. 11183643.3 dated Dec. 29, 2011.

*Primary Examiner* — Edward Glick
*Assistant Examiner* — Anthony G Quash
(74) *Attorney, Agent, or Firm* — Cantor Colburn LLP

(57) ABSTRACT

A liquid crystal display includes: first and second substrate opposite to each other; data lines on the first substrate which transmits a first voltage; a voltage transmitting line on the first substrate which transmits a second voltage; and first and second pixel electrodes on the first substrate and spaced apart from each other, where one of the first and second pixel electrodes is applied with the first voltage through the data lines, the other of the first and second pixel electrodes is applied with the second voltage through the voltage transmitting line, each of the first and second pixel electrodes includes a stem and branches electrodes extending from the stem, the branches of the first pixel electrode and the branches of the second pixel electrode are alternately disposed, and the stems of the first and second pixel electrodes overlap at least a portion of the voltage transmitting line.

28 Claims, 12 Drawing Sheets

(51) Int. Cl.
*G02F 1/1362* (2006.01)
*G02F 1/136* (2006.01)

(56) References Cited

U.S. PATENT DOCUMENTS

| | | |
|---|---|---|
| 7,443,477 B2 | 10/2008 | Lin et al. |
| 7,599,033 B2 | 10/2009 | Son |
| 7,663,583 B2 | 2/2010 | Lee et al. |
| 7,667,807 B2 | 2/2010 | Nishida |
| 7,724,336 B2 | 5/2010 | Kim et al. |
| 7,777,852 B2 | 8/2010 | Kawasaki et al. |
| 2002/0159016 A1 | 10/2002 | Nishida et al. |
| 2002/0171796 A1 | 11/2002 | Kim |
| 2004/0085278 A1 | 5/2004 | Chae et al. |
| 2004/0183977 A1 | 9/2004 | Kitagawa et al. |
| 2005/0231675 A1 | 10/2005 | Chen et al. |
| 2006/0023134 A1 | 2/2006 | Um et al. |
| 2007/0182902 A1 | 8/2007 | Chung et al. |
| 2009/0310047 A1* | 12/2009 | Shin et al. ............ 349/37 |
| 2010/0109994 A1* | 5/2010 | Lee et al. ............ 345/98 |
| 2010/0123137 A1* | 5/2010 | Yang et al. ............ 257/59 |
| 2010/0149445 A1 | 6/2010 | Lee et al. |
| 2010/0149449 A1 | 6/2010 | Lee |
| 2010/0296015 A1* | 11/2010 | Kim et al. ............ 349/37 |
| 2012/0013817 A1* | 1/2012 | Kim et al. ............ 349/41 |

FOREIGN PATENT DOCUMENTS

| | | |
|---|---|---|
| JP | 10104664 A | 4/1998 |
| JP | 2003131636 | 5/2003 |
| JP | 2009301010 | 12/2009 |
| JP | 2010164939 | 7/2010 |
| JP | 2010191426 | 9/2010 |
| JP | 2010271701 | 12/2010 |
| KR | 100293434 | 4/2001 |
| KR | 1020060083096 A | 7/2006 |
| KR | 1020070072175 | 7/2007 |
| KR | 1020090111730 | 10/2009 |

* cited by examiner

LIQUID CRYSTAL DISPLAY

This application claims priority to Korean Patent Application No. 10-2011-0008627 filed on Jan. 28, 2011, and all the benefits accruing therefrom under 35 U.S.C. §119, the content of which in its entirety is herein incorporated by reference.

BACKGROUND OF THE INVENTION (a) Field of the Invention

Exemplary embodiments of the present invention relate to a liquid crystal display.

(b) Description of the Related Art

A liquid crystal display (hereinafter referred to as an "LCD") is one of the most widely used type of flat panel displays. The LCD includes two display panels provided with electric field generating electrodes, such as pixel electrodes and a common electrode, respectively, and a liquid crystal layer interposed between the two display panels. In the LCD, voltages are applied to the electric field generating electrodes to generate an electric field in the liquid crystal layer. Due to the generated electric field, liquid crystal molecules of the liquid crystal layer are aligned and polarization of incident light is controlled, thereby displaying images.

In general, it may be necessary to realize a liquid crystal display having a high contrast ratio, excellent viewing angle, and fast response speed to improve the display quality of the liquid crystal display.

Also, when the pixel electrode and the signal line overlap each other to increase the aperture ratio of the liquid crystal display, a parasitic capacitance between the signal line and the pixel electrode increases such that display quality may be deteriorated by crosstalk.

BRIEF SUMMARY OF THE INVENTION

Exemplary embodiments of the present invention provide a liquid crystal display with a high contrast ratio and a wide viewing angle of the liquid crystal display, with increased response speed of liquid crystal molecules, and which prevents crosstalk caused by an parasitic capacitance between a signal line and a pixel electrode while having a high aperture ratio, thereby improving display characteristics.

In an exemplary embodiment, a liquid crystal display includes: a first substrate; a second substrate disposed opposite to the first substrate; a liquid crystal layer interposed between the first substrate and the second substrate and including liquid crystal molecules; a gate line disposed on the first substrate, where the gate line transmits a gate signal; a plurality of data lines disposed on the first substrate, where the plurality of data lines transmits a first voltage; a voltage transmitting line disposed on the first substrate, where the voltage transmitting line transmits a second voltage; a first pixel electrode disposed on the first substrate; and a second pixel electrode disposed on the first substrate and spaced apart from the first pixel electrode, where one of the first pixel electrode and the second pixel electrode is applied with the first voltage through the plurality of data lines, the other of the first pixel electrode and the second pixel electrode is applied with the second voltage through the voltage transmitting line, each of the first pixel electrode and the second pixel electrode includes a stem and a plurality of branches electrodes extending from the stem, the branches of the first pixel electrode and the branches of the second pixel electrode are alternately disposed, and the stems of the first pixel electrode and the second pixel electrode overlap at least a portion of the voltage transmitting line.

In an exemplary embodiment, the stems of the first pixel electrode and the second pixel electrode may cover at least two thirds of the area of the voltage transmitting line.

In an exemplary embodiment, the liquid crystal display may further include a plurality of pixels, where each of the plurality of pixels includes the first pixel electrode and the second pixel electrode, and the voltage transmitting line corresponds to three of the plurality of pixels.

In an exemplary embodiment, the plurality of pixels may include a first pixel and a second pixel neighboring each other, a data line of the plurality of data lines may be disposed between the first pixel and the second pixel, the stems of the first pixel electrode and the second pixel electrode of the first pixel may include a first portion overlapping the data line disposed between the first pixel and the second pixel, the stems of the first pixel electrode and the second pixel electrode of the second pixel may include a second portion overlapping the data line disposed between the first pixel and the second pixel, and the first portion and the second portion may be applied with the first voltage and disposed opposite to each other with respect to the data line disposed between the first pixel and the second pixel.

In an exemplary embodiment, the stems of the first pixel electrode and the second pixel electrode of the first pixel may include a third portion overlapping the data line disposed between the first pixel and the second pixel, the stems of the first pixel electrode and the second pixel electrode of the second pixel may include a fourth portion overlapping the data line disposed between the first pixel and the second pixel, and the third portion and the fourth portion may be applied with the second voltage and disposed opposite to each other with respect to the data line disposed between the first pixel and the second pixel.

In an exemplary embodiment, the liquid crystal display may further include a first region including a first interval between the branches of the first pixel electrode and adjacent branches of the second pixel electrode, and a second region including a second interval between the branches of the first pixel electrode and the adjacent branches of the second pixel electrode, where the first interval is greater than the second interval, and the first region includes a region where the stems of the first pixel electrode and the second pixel electrode are not disposed at an edge of a pixel area.

In an exemplary embodiment, the liquid crystal layer may be vertically aligned.

In an exemplary embodiment, the first pixel electrode and the second pixel electrode may be applied with voltages having different polarities.

In an exemplary embodiment, the liquid crystal display may further include an extension region including a third interval between the branches of the first pixel electrode and the adjacent branches of the second pixel electrode, where the third interval is greater than the first interval in the first region.

In an alternative exemplary embodiment, a liquid crystal display includes: a first substrate; a second substrate disposed opposite to the first substrate; a liquid crystal layer interposed between the first substrate and the second substrate and including liquid crystal molecules; a gate line disposed on the first substrate, where the gat line transmits a gate signal; a plurality of data lines disposed on the first substrate, where the plurality of data lines transmits a first voltage; a voltage transmitting line disposed on the first substrate, where the voltage transmitting line transmits a second voltage having a polarity changed per frame; and a plurality of pixel electrode including a first pixel and a second pixel neighboring each other, where each of the plurality of pixels includes a first pixel electrode disposed on the first substrate, and a second pixel electrode disposed on the first substrate and spaced apart from the first pixel electrodes, where one of the first pixel electrode and the second pixel electrode is applied with the first voltage through the plurality of data lines, and the other of the first pixel electrode and the second pixel electrode is applied with the second voltage through the voltage transmitting line, each of the first pixel electrode and the second pixel electrode includes a stem and a plurality of branches extending from the stem, the branches of the first pixel electrode and the branches of the second pixel electrode are alternately disposed, a data line of the plurality of data lines is disposed between the first pixel and the second pixel of the plurality of pixels, the stems of the first pixel electrode and the second pixel electrode of the first pixel include a first portion overlapping the data line disposed between the first pixel and the second pixel, the stems of the first pixel electrode and the second pixel electrode of the second pixel includes a second portion overlapping the data line disposed between the first pixel and the second pixel, and the first portion and the second portion are applied with the first voltage and are disposed opposite to each other with respect to the data line disposed between the first pixel and the second pixel.

According to exemplary embodiments of the present invention, a high contrast ratio and a wide viewing angle of the liquid crystal display may be simultaneously ensured, the response speed of the liquid crystal molecule and the aperture ratio may be improved, and simultaneously crosstalk due to an increase of the parasitic capacitance between the signal line and the pixel electrode may be effectively prevented, and display characteristics is thereby substantially improved.

BRIEF DESCRIPTION OF THE DRAWINGS

The above and other aspects, advantages and features of the invention will become more apparent by describing in further detail exemplary embodiments thereof with reference to the accompanying drawings, in which.

DETAILED DESCRIPTION OF THE INVENTION

Figure 1:
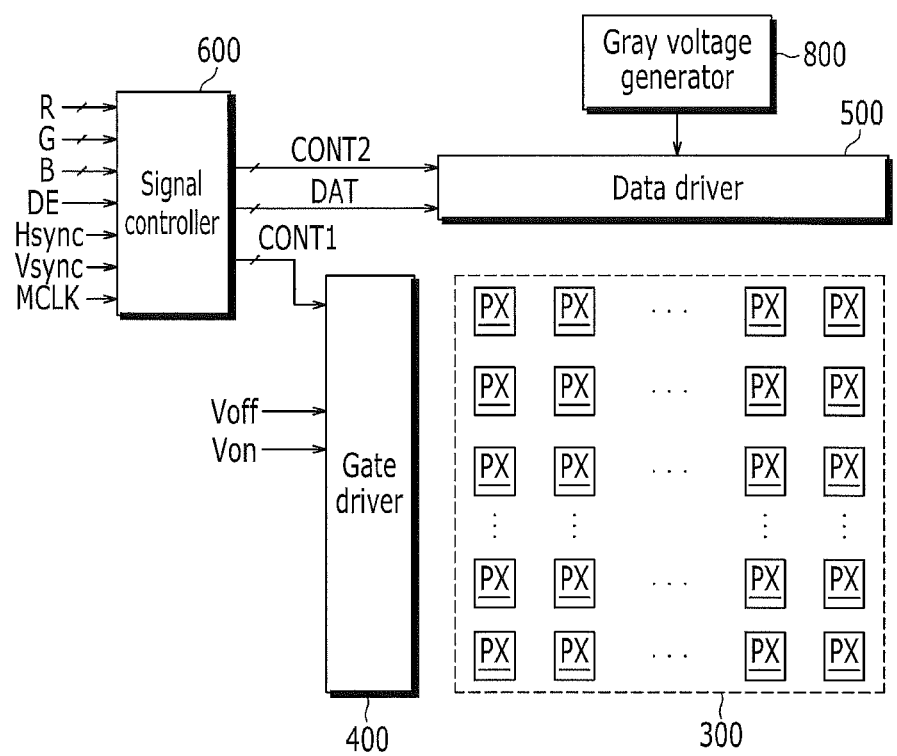
FIG. 1 is a block diagram showing an exemplary embodiment of a liquid crystal display according to the present invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, an exemplary embodiment of a liquid crystal display the present invention will be described in detail with reference to the accompanying drawings.

Firstly, an exemplary embodiment of a liquid crystal display according to the present invention will be described with reference to FIGS. 1 to 3. FIG. 1 is a block diagram showing an exemplary embodiment of the liquid crystal display according to the present invention, FIG. 2 is an equivalent circuit diagram showing a structure of an exemplary embodiment of a liquid crystal display and one pixel according to the present invention, and FIG. 3 is an equivalent circuit diagram showing a plurality of adjacent pixels of an exemplary embodiment of the liquid crystal display according to the present invention.

Referring to FIG. 1, a liquid crystal display includes a liquid crystal panel assembly 300, a gate driver 400, a data driver 500, a gray voltage generator 800 and a signal controller 600. In an exemplary embodiment, the signal controller 600 may receive data signals R, G and B, a vertically synchronized signal Vsync, a horizontally synchronized signal Hsync, a main clock signal MCLK and a data enable signal DE from an external device. The gate driver 400 may receive a first control signal CONT1 from the signal controller 600, a gate-on voltage Von and a gate-off voltage Voff, and the data driver 500 may receive a second control signal CONT2 and an image signal DAT from the signal controller 600.

Figure 2:
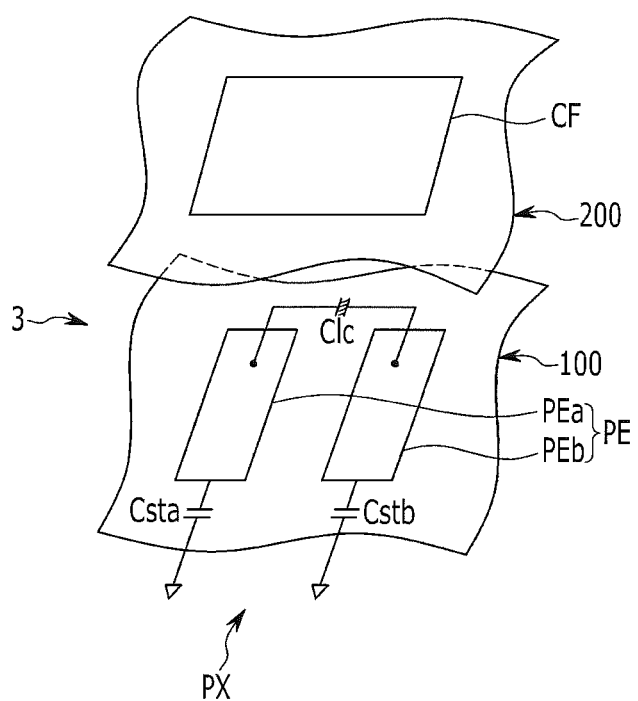
FIG. 2 is an equivalent circuit diagram showing a structure of an exemplary embodiment of the liquid crystal display and one pixel according to the present invention.
Figure 3:
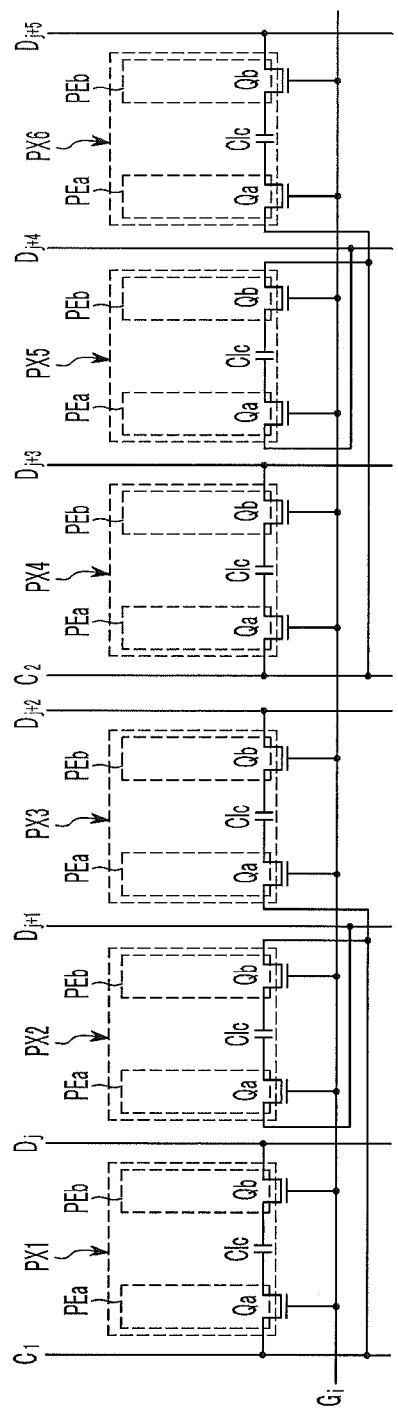
FIG. 3 is an equivalent circuit diagram showing a plurality of adjacent pixels of an exemplary embodiment of a liquid crystal display according to the present invention.

Referring to FIG. 2, the liquid crystal panel assembly 300 includes a lower panel 100 and an upper panel 200 disposed opposite to, e.g., facing, each other, and a liquid crystal layer 3 interposed therebetween.

The liquid crystal capacitor Clc adopts a first pixel electrode PEa and a second pixel electrode PEb of the lower panel 100 as two terminals, and the liquid crystal layer 3 between the first and second pixel electrodes PEa and PEb serves as a dielectric material. The first pixel electrode PEa is connected to the first switching element (not shown) and the second pixel electrode PEb is connected to the second switching element (not shown).

The liquid crystal layer 3 has dielectric anisotropy, and liquid crystal molecules 31 of the liquid crystal layer 3 may be arranged such that their long axes are aligned perpendicular to surfaces of the two panels 100 and 200 when an electric field is not applied.

The first pixel electrode PEa and the second pixel electrode PEb may be formed on different layers or on the same layer. First and second storage capacitors (not shown) serving as assistants of the liquid crystal capacitor Clc may be formed by further including separate electrodes (not shown) provided on the lower panel 100 and interposed between the first and second pixel electrodes PEa and PEb, and insulators. Although not shown, an alternative exemplary embodiment of the liquid crystal display may include an additional electrode on the upper panel 200 and applied with a predetermined voltage of a constant magnitude, and the additional electrode may be transparent.

In an exemplary embodiment, each pixel PX uniquely displays one of primary colors (spatial division), or each pixel PX temporally and alternately displays primary colors (temporal division), to realize color display. Then, the primary colors are spatially or temporally synthesized, and thus a desired color is recognized. An exemplary embodiment of the primary colors may include three primary colors of red, green and blue. Also, each pixel may display a white color as well as three primary colors of red, green and blue. One exemplary of the spatial division is represented in FIG. 2, where each pixel PX is provide with a color filter CF indicating one of the primary colors on the region of the upper panel 200 and corresponding to the first and second pixel electrodes PEa and PEb. In an alternative exemplary embodiment, unlike FIG. 2, the color filter CF may be disposed on or below the first and second pixel electrodes PEa and PEb of the lower panel 100.

Referring to FIGS. 1 and 3, in a view of an equivalent circuit, the liquid crystal panel assembly 300 includes a plurality of signal lines Gi, C1, C2, Dj, Dj+1, Dj+2, Dj+3, Dj+4, and Dj+5, and a plurality of pixels PX connected thereto and arranged substantially in a matrix format. In the structure shown in FIG. 2, the liquid crystal panel assembly 300 includes the lower panel 100 and the upper panel 200 facing each other, and the liquid crystal layer 3 interposed therebetween.

The signal lines Gi, C1, C2 Dj, Dj+1, and Dj+2 include a plurality of gate lines, e.g., an i-th gate line Gi, that transmits gate signals (also referred to as "scanning signals"), a plurality of data lines, e.g., a j-th data line Dj, a (j+1)-th data line Dj+1, a (j+2)-th data line Dj+2, a (j+3)-th data line Dj+3, a (j+4)-th data line Dj+4, and a (j+5)-th data line Dj+5, that transmits data voltages, a first voltage transmitting line C1 that transmits a first voltage, and a second voltage transmitting line C2 that transmits a second voltage. The gate lines Gi extend substantially in a row direction and substantially parallel to each other, and the data lines Dj, Dj+1, Dj+2, Dj+3, Dj+4, and Dj+5, the first voltage transmitting line C1, and the second voltage transmitting line C2 extend substantially in a column direction and substantially parallel to each other.

A plurality of pixels PX include a first pixel PX1, a second pixel PX2, a third pixel PX3, a fourth pixel PX4, a fifth pixel PX5 and a sixth pixel PX6 that are sequentially disposed in a row direction of the pixel.

Among three neighboring pixels, e.g., the first, second and third pixels PX1, PX2, and PX3, the first pixel PX1 includes a first switching element Qa and a second switching element Qb connected to the signal lines, e.g., the i-th gate line Gi, the first voltage transmitting line C1, and the j-th data line Dj, and the liquid crystal capacitor Clc connected thereto, the second pixel PX2 includes a first switching element Qa and a second switching element Qb connected to the signal lines, e.g., the i-th gate line Gi, the first voltage transmitting line C1, and the (j+1)-th data line Dj+1, and the liquid crystal capacitor Clc connected thereto, and the third pixel PX3 includes a first switching element Qa and a second switching element Qb connected to the signal lines, e.g., the i-th gate line Gi, the first voltage transmitting line C1, and the (j+2)-th data line Dj+2, and the liquid crystal capacitor Clc connected thereto.

The first switching element Qa and the second switching element Qb of three neighboring pixels PX1, PX2, and PX3 as three terminal elements such as a thin film transistors provided in the lower panel 100 and including a control terminal connected to the gate line Gi, an input terminal connected to the first voltage transmitting line C1 or the corresponding data lines Dj, Dj+1, and Dj+2, and an output terminal connected to the liquid crystal capacitor Clc.

Among three neighboring pixels, e.g., the fourth pixel PX4, the fifth pixel PX5, and the sixth pixel PX6, the fourth pixel PX4 includes a first switching element Qa and a second switching element Qb connected to the signal lines, e.g., the i-th gate line Gi, the second voltage transmitting line C2, and the (j+3)-th data line Dj+3, and the liquid crystal capacitor Clc connected thereto, the fifth pixel PX5 includes a first switching element Qa and a second switching element Qb connected to the signal lines, e.g., the i-th gate line Gi, the second voltage transmitting line C2, and the (j+4)-th data line Dj+4, and the liquid crystal capacitor Clc connected thereto, and the sixth pixel PX6 includes a first switching element Qa and a second switching element Qb connected to the signal lines, e.g., the i-th gate line Gi, the second voltage transmitting line C2, and the (j+5)-th data line Dj+5, and the liquid crystal capacitor Clc connected thereto.

The first switching element Qa and the second switching element Qb of the three neighboring pixels pixel PX4, PX5, and PX6 as three terminal elements such as thin film transistors provided in the lower panel 100 and including a control terminal connected to the gate line Gi, an input terminal connected to the second voltage transmitting line C2 or the corresponding data lines Dj+3, Dj+4, and Dj+5, and an output terminal connected to the liquid crystal capacitor Clc.

Hereinafter, an exemplary embodiment of a driving method of a liquid crystal display according to the present invention will be described with reference to FIGS. 2, 3 and 4.

Figure 4:
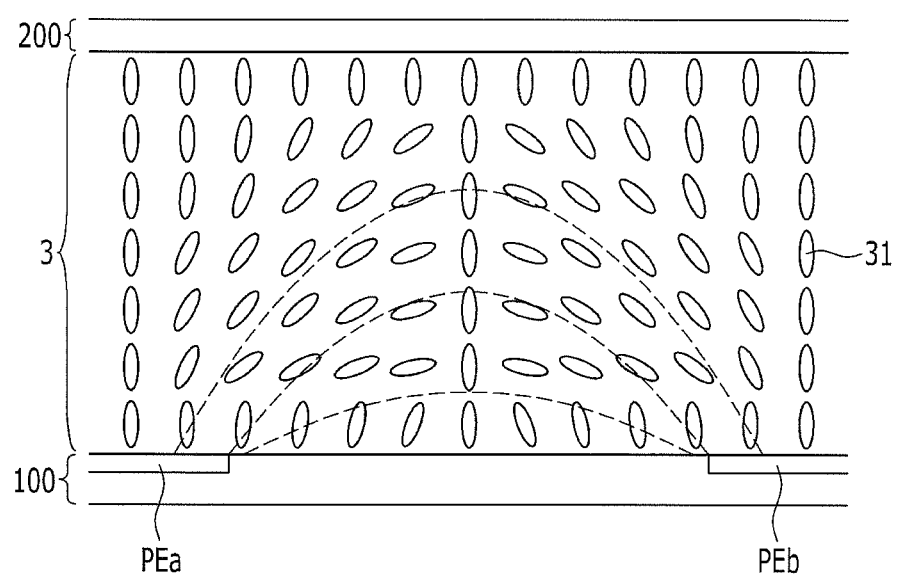
FIG. 4 is a cross-sectional view of an exemplary embodiment of the liquid crystal display according to the present invention.

FIG. 4 is a cross-sectional view of an exemplary embodiment of a liquid crystal display according the present invention.

Referring to FIGS. 2 and 3, when the first voltage transmitting line C1 is applied with the first voltage and the data lines Dj, Dj+1, and Dj+2 are applied with the data voltage, the data voltage is applied to the corresponding pixels PX1, PX2, and PX3 via the turned-on first and second switching elements Qa and Qb. In detail, the first pixel electrode PEa of the first pixel PX1 is applied with the first voltage through the first voltage transmitting line C1 via the first switching element Qa thereof, and the second pixel electrode PEb is applied with the data voltage through the first data line Dj via the second switching element Qb thereof. Also, the first pixel electrode PEa of the second pixel PX2 is applied with the data voltage through the second data line Dj+1 via the first switching element Qa thereof, and the second pixel electrode PEb is applied with the first voltage through the first voltage transmitting line C1 via the second switching element Qb thereof. Also, the first pixel electrode PEa of the third pixel PX3 is applied with the first voltage through the first voltage transmitting line Cj via the first switching element Qa thereof, and the second pixel electrode PEb is applied with the data voltage through the third data line Dj+2 via the second switching element Qb thereof.

Also, when the second voltage transmitting line C2 is applied with the second voltage and the data lines Dj+3, Dj+4, and Dj+5 are applied with the data voltage, the data voltage is applied to the corresponding pixels PX4, PX5, and PX6 via the turned-on first and second switching elements Qa and Qb. In detail, the first pixel electrode PEa of the fourth pixel PX4 is applied with the second voltage through the second voltage transmitting line C2 via the first switching element Qa thereof, and the second pixel electrode PEb is applied with the data voltage through the fourth data line Dj+3 via the second switching element Qb thereof. Also, the first pixel electrode PEa of the fifth pixel PX5 is applied with the data voltage through the fifth data line Dj+4 via the first switching element Qa thereof, and the second pixel electrode PEb is applied with the second voltage through the second voltage transmitting line C2 via the second switching element Qb thereof. Further, the first pixel electrode PEa of the sixth pixel PX6 is applied with the second voltage through the second voltage transmitting line C2 via the first switching element Qa thereof, and the second pixel electrode PEb is applied with the data voltage through the sixth data line Dj+5 via the second switching element Qb thereof.

In an exemplary embodiment, the voltage applied to the first pixel electrode PEa and the second pixel electrode PEb of the pixels PX1, PX2, PX3, PX4, PX5, and PX6 are corresponding to luminance displayed by the pixel PX.

The first voltage transmitted through the first voltage transmitting line C1 and the second voltage transmitted through the second voltage transmitting line C2 may have opposite polarities with respect to a reference voltage. In one exemplary embodiment, for example, when a minimum voltage of the liquid crystal display is about zero (0) volt (V) and a maximum voltage is about 14 V, the reference voltage may be about 7 V, the voltage transmitted through the first voltage line C1 may be about 0 V or about 14 V, and the voltage transmitted through the second voltage line C2 may be about 14 V or about 0 V. Also, the polarities of the first voltage transmitted through the first voltage line C1 and the second voltage transmitted through the second voltage line C2 may be changed per frame.

The difference between the two data voltages applied to the first and second pixels PXa and PXb corresponds to a charged voltage of the liquid crystal capacitors Clc, i.e., a pixel voltage. When a potential difference is generated between the two terminals of the liquid crystal capacitor Clc, as shown in FIG. 4, an electric field substantially parallel to the surface of the display panel 100 and 200 is generated in the liquid crystal layer 3 between the first and second pixel electrodes PEa and PEb. When the liquid crystal molecules 31 have positive dielectric anisotropy, the liquid crystal molecules 31 are arranged such that the longitudinal axes thereof are aligned substantially parallel to the direction of the electric field, and the degree of inclination of the longitudinal axes is changed according to the magnitude of the pixel voltage. This liquid crystal layer 3 is referred to as an electrically-induced optical compensation ("EOC") mode liquid crystal layer. Also, the change degree of the polarization of light passing through the liquid crystal layer 3 is changed according to the inclination degree of the liquid crystal molecules 31. The change of the polarization appears as a change of transmittance of the light by the polarizer, and the pixel PX thereby displays a predetermined luminance.

Figure 5:
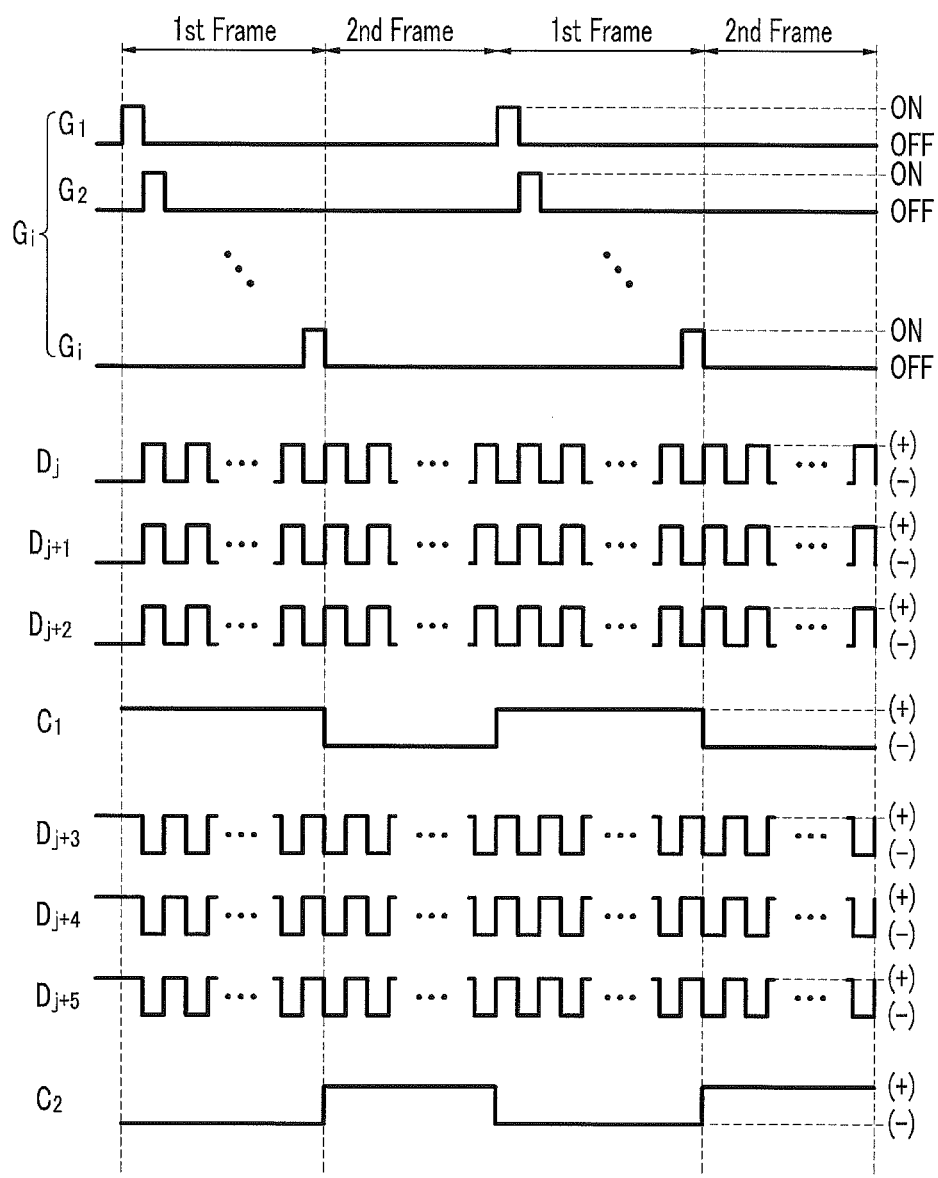
FIG. 5 is a signal timing diagram of signals applied to a pixel of the liquid crystal display shown in FIG. 3.

Hereinafter, an exemplary embodiment of a driving method of a liquid crystal display according to the present invention will be described with reference to FIGS. 3 and 5. FIG. 5 is a signal timing diagram of signals applied to a pixel of the liquid crystal display shown in FIG. 3.

Firstly, a driving method during the first frame (1st Frame) will be described. When the gate lines Gi is sequentially applied with the gate-on voltage, the first pixel electrode PEa of the first pixel PX1 is applied with the first voltage through the first voltage transmitting line C1 via the turned-on first switching element Qa thereof, the second pixel electrode PEb of the first pixel PX1 is applied with the data voltage through the first data line Dj via the turned-on second switching element Qb thereof, the first pixel electrode PEa of the second pixel PX2 is applied with the data voltage through the second data line Dj+1 via the turned-on first switching element Qa thereof, and the second pixel electrode PEb of the second pixel PX2 is applied with the first voltage through the first voltage transmitting line C1 via the turned-on second switching element Qb thereof. Also, the first pixel electrode PEa of the third pixel PX3 is applied with the first voltage through the first voltage transmitting line Cj via the turned-on first switching element Qa thereof, and the second pixel electrode PEb of the third pixel PX3 is applied with the data voltage through the third data line Dj+2 via the turned-on second switching element Qb thereof. Similarly, the first pixel electrode PEa of the fourth pixel PX4 is applied with the second voltage through the second voltage transmitting line C2 via the turned-on first switching element Qa thereof, and the second pixel electrode PEb of the fourth pixel PX4 is applied with the data voltage through the fourth data line Dj+3 via the turned-on second switching element Qb thereof. Also, the first pixel electrode PEa of the fifth pixel PX5 is applied with the data voltage through the fifth data line Dj+4 via the turned-on first switching element Qa thereof, and the second pixel electrode PEb of the fifth pixel PX5 is applied with the second voltage through the second voltage transmitting line C2 via the turned-on second switching element Qb thereof. Further, the first pixel electrode PEa of the sixth pixel PX6 is applied with the second voltage through the second voltage transmitting line C2 via the turned-on first switching element Qa thereof, and the second pixel electrode PEb of the sixth pixel PX6 is applied with the data voltage through the sixth data line Dj+5 via the turned-on second switching element Qb thereof.

In an exemplary embodiment, the polarity of the first voltage transmitted through the first voltage transmitting line C1 may be positive (+), and the polarity of the second voltage transmitted through the second voltage transmitting line C2 may be negative (−). Accordingly, during the first frame, the polarities of the first pixel PX, the second pixel PX2 and the third pixel PX3 are positive (+), and the polarities of the fourth pixel PX4, the fifth pixel PX5, and the sixth pixel PX6 are negative (−).

However, in an alternative exemplary embodiment of the present invention, the polarity of the first voltage applied to the first voltage transmitting line C1 may be negative (−), and the polarity of the second voltage applied to the second voltage line C2 may be positive (+).

The steps described above are repeated for the pixel row connected to the gate lines, and thereby the first frame (1st Frame) is completed. When the first frame (1st Frame) is completed, the second frame (2nd Frame) is started.

When the second frame (2nd Frame) is started, the gate-on voltage is sequentially applied to the gate lines Gi, and the signal is applied to each pixel similarly to the signals applied in the first frame. However, during the second frame, the polarities of the first voltage transmitted through the first voltage transmitting line C1 and the second voltage transmitted through the second voltage transmitting line C2 are opposite to that of the first frame. Accordingly, the polarity of a pixel PX in the second frame is opposite to the polarity of the pixel in the first frame. In detail, during the second frame, the polarities of the first pixel PX, the second pixel PX2 and the third pixel PX3 are negative (−), and the polarities of the fourth pixel PX4, the fifth pixel PX5 and the sixth pixel PX6 are positive (+).

However, in an alternative exemplary embodiment of the present invention, the polarity of the first voltage applied to the first voltage transmitting line C1 during the second frame may be positive (+), and the polarity of the second voltage applied to the second voltage line C2 may be negative (−).

The first frame and the second frame are repeated such that the desired pixel voltage is applied to each pixel during the desired frame.

In general, one pixel may be connected to one gate line and two different data lines to charge a desired voltage to the liquid crystal capacitor Clc by dividing one pixel into two pixel electrodes and applying the different voltages to the two pixel electrodes via the different switching elements. More particularly, the first and second switching elements connected to the first and second pixel electrodes of each pixel may be connected to the same gate line and the different data lines, thereby receiving the data voltage through the different data lines.

In an exemplary embodiment, one pixel of the liquid crystal display is connected to two gate lines, one data line, and a first voltage transmitting line and a second voltage transmitting line. Accordingly, the number of data lines is substantially reduced, and thereby the cost of the driver of the liquid crystal display is substantially reduced. According to the arrangement of the signal lines and the pixels of an exemplary embodiment of the liquid crystal display, two voltage lines are added compared with a typical arrangement of the signal lines and the pixels. However, the voltage lines are applied with the voltage that has the constant value during one frame and has the polarity that is changed per frame such that a driver having a simplified structure may be realized to apply the voltage having the constant value and the polarity that is changed per frame, and the driving method is thereby substantially simplified and the manufacturing cost is substantially reduced.

Figure 6:
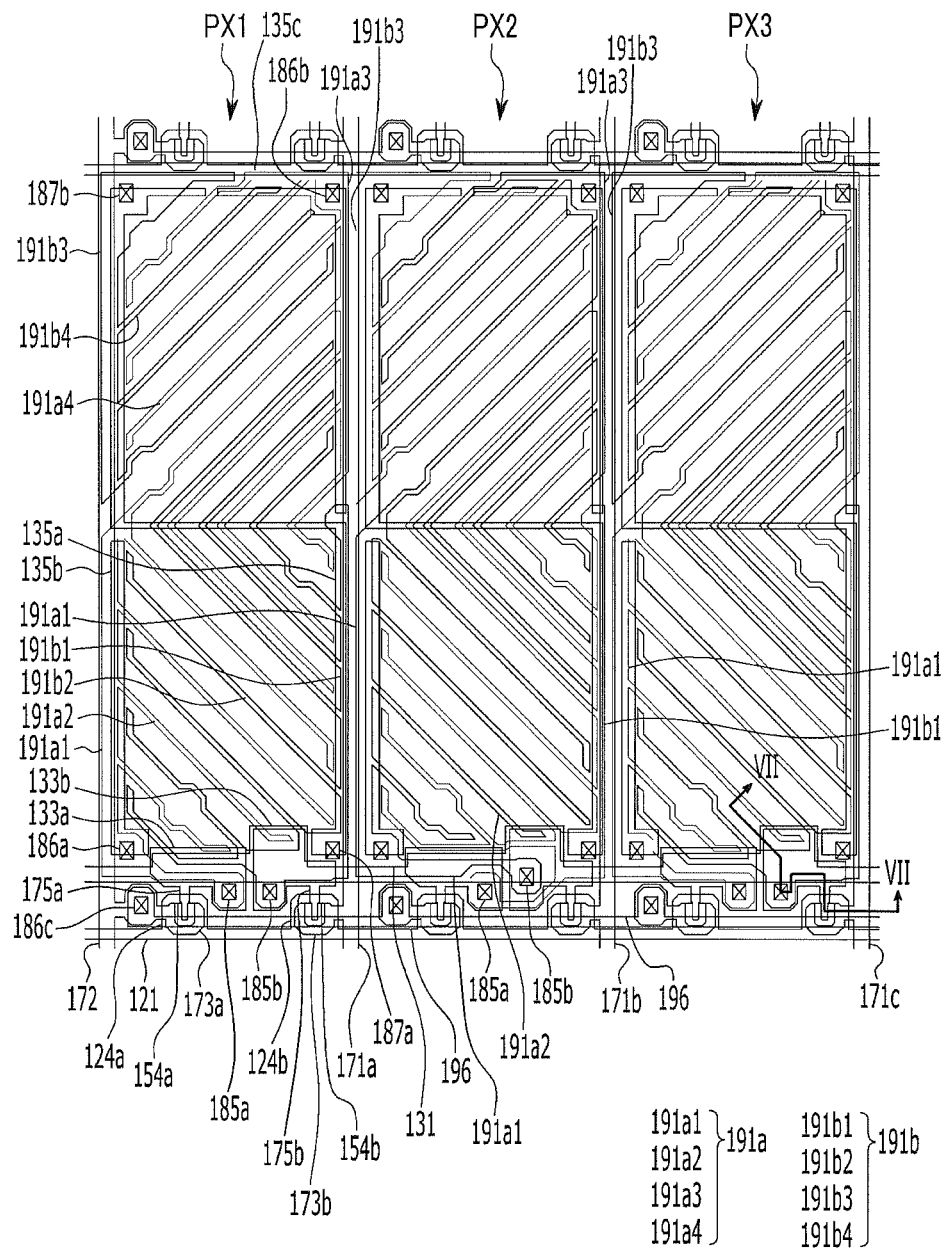
FIG. 6 is a top plan view of an exemplary embodiment of a liquid crystal display according to the present invention.

Next, an exemplary embodiment of the above-described liquid crystal display will be described with reference to FIGS. 6 and 7. FIG. 6 is a top plan view of an exemplary embodiment of the liquid crystal display according to the present invention, and FIG. 7 is a cross-sectional view of the liquid crystal panel assembly in FIG. 6 taken along line VII-VII.

Figure 7:
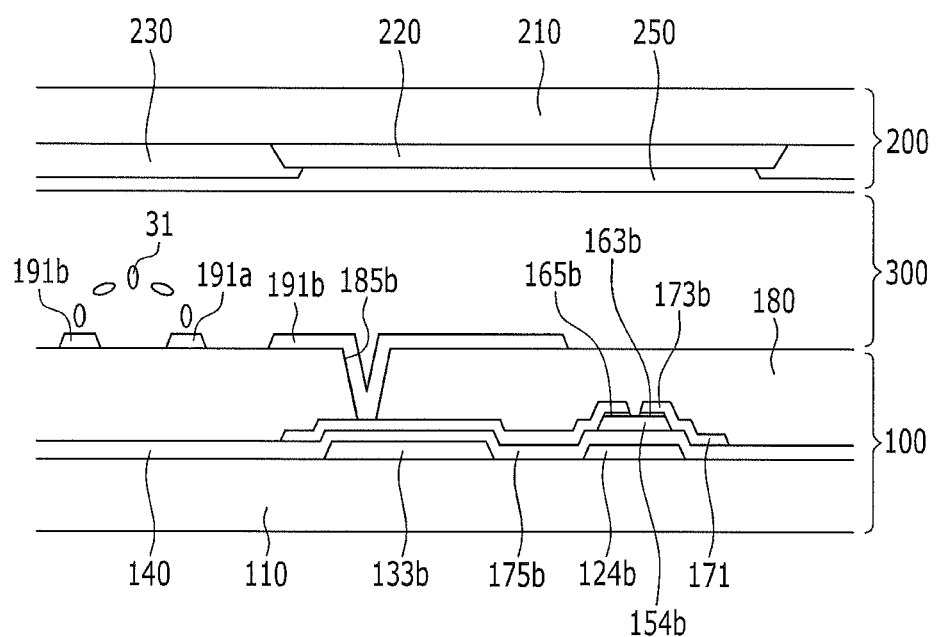
FIG. 7 is a cross-sectional view of an exemplary embodiment of the liquid crystal panel assembly of FIG. 6 taken along line VII-VII.

Referring to FIGS. 6 and 7, a liquid crystal panel assembly according to an exemplary embodiment of the present invention includes a lower panel 100 and an upper panel 200 disposed substantially opposite to each other, and a liquid crystal layer 3 interposed between the lower and upper display panels 100 and 200.

Firstly, the lower panel 100 will be described.

A plurality of gate conductors including a plurality of gate lines 121, a plurality of storage electrode lines 131, and first to third connection conductors 135a, 135b and 135c are disposed on a first insulation substrate 110.

The gate lines 121 transmit gate signals and longitudinally extend in a transverse direction, and each gate line 121 includes a plurality of pairs of a first gate electrode 124a and a second gate electrode 124b protruding upward from a main portion of the gate line 121 and in a longitudinal direction.

The storage electrode lines 131 are applied with a predetermined voltage and mainly extend in the transverse direction. Each storage electrode line 131 is positioned between two neighboring gate lines 121 and is close to the lower of the neighboring gate lines 121 in the top plan view. Each storage electrode line 131 includes a plurality of first storage electrodes 133a and second storage electrodes 133b protruding upward from the main portion of the storage electrode line 131 and in the longitudinal direction. The connection conductors 135a, 135b and 135c are disposed at an edge and a center of the pixel area.

The gate conductor may have a single layer or a multi-layer structure.

A gate insulating layer 140 including silicon nitride (SiNx) or silicon oxide (SiOx) is disposed on the gate conductor.

A plurality of pairs of a first semiconductor 154a and a second semiconductor 154b including hydrogenated amorphous silicon or polysilicon are formed on the gate insulating layer 140. The first semiconductor 154a and the second semiconductor 154b are positioned overlapping the first gate electrode 124a and the second gate electrode 124b, respectively.

A pair of ohmic contacts (not shown) are disposed overlapping each of the first semiconductors 154a, and a pair of ohmic contacts 163b and 165b are disposed overlapping each the second semiconductors 154b. The ohmic contact may include a material such as n+ hydrogenated amorphous silicon, which is highly doped with an n-type impurity such as phosphorous (P), or of silicide. In an alternative exemplary embodiment, the ohmic contacts may be omitted. In detail, when at least one of the first semiconductor 154a and the second semiconductor 154b include an oxide semiconductor, the ohmic contacts may be omitted.

A data conductor including a plurality of data lines, e.g., a first data line 171a, a second data line 171b and a third data line 171c and voltage transmitting lines 172, and a plurality of pairs of a first drain electrode 175a and a second drain electrode 175b is disposed on the ohmic contacts 163a and 165a and the gate insulating layer 140.

The data lines 171a, 171b and 171c, which transmit data signals, mainly extend in the longitudinal direction and intersect the gate lines 121 and the storage electrode lines 131. The voltage transmitting line 172 transmits a voltage of a constant magnitude, and extends substantially parallel to the data lines 171a, 171b, and 171c thereby intersecting the gate lines 121 and the storage electrode lines 131. The voltage transmitting line 172 includes a first source electrode 173b that extends from a main portion of the voltage transmitting line 172 and is curved with a U-like shape toward the first gate electrode 124b in the top plan view.

Each of the data lines 171a, 171b, and 171c include a second source electrode 173b that is curved with a U-like shape toward the second gate electrode 124b.

The voltage transmitted by the voltage transmitting line 172 may have a constant magnitude, and the polarity thereof may be changed per frame. The first source electrodes 173a of the second pixel PX2 and the third pixel PX3 are connected to the first source electrode 173a of the first pixel PX1 connected to the voltage transmitting line 172 via a contact hole 186c and a connection member 196, thereby receiving the same signal. The voltage transmitting line 172 transmits the voltage to three pixels PX1, PX2 and PX3.

Each of the first drain electrode 175a and the second drain electrode 175b includes a bar-shaped first end and a second end having a wide area in the top plan view. The bar-shape first ends of the first drain electrode 175a and the second drain electrode 175b are opposite to the first source electrode 173a and the second source electrode 173b with respect to the first gate electrode 124a and the second gate electrode 124b, and are partially enclosed by the curved first source electrode 173a and second source electrode 173b, respectively. The second ends of the first drain electrode 175a and the second drain electrode 175b are electrically connected to a first pixel electrode 191a and a second pixel electrode 191b via a first contact hole 185a and a second contact hole 185b, which will be described in greater detail later.

The first gate electrode 124a, the first source electrode 173a, and the first drain electrode 175a collectively define a first thin film transistor ("TFT") along with the first semiconductor 154a, and a channel of the first TFT is formed on the first semiconductor 154a between the first source electrode 173a and the first drain electrode 175a.

The second gate electrode 124b, the second source electrode 173b and the second drain electrode 175b collectively define a second TFT along with the second semiconductor 154b, and a channel of the second TFT is formed on the second semiconductor 154b between the second source electrode 173b and the second drain electrode 175b.

The data conductors 171, 172, 175a and 175b may have a single layer or multilayer structure.

The ohmic contacts are interposed only between the underlying semiconductors 154a and 154b and the overlying data conductors 171, 172, 175a, and 175b thereon, respectively, and reduce contact resistance therebetween. The semiconductors 154a and 154b include exposed portions that are not covered by the data conductors 171, 172, 175a, and 175b, and portions that are disposed between the source electrodes 173a and 173b and the drain electrodes 175a and 175b.

A passivation layer 180 including an inorganic insulator or organic insulator is disposed on the data conductors 171, 172, 175a, and 175b and the exposed portions of the semiconductors 154a and 154b.

The passivation layer 180 has a plurality of the first and second contact holes 185a and 185b at the wide second ends of the first drain electrode 175a and the second drain electrode 175b. The passivation layer 180 and the gate insulating layer 140 have a plurality of contact holes 186a, 186b, 187a and 187b exposing portions of the first to third connection conductors 135a, 135b, and 135c.

A plurality of pixel electrodes 191 including a transparent conductive material such as indium tin oxide ("ITO") or indium zinc oxide ("IZO") or a reflective metal such as aluminum, silver, chromium, or alloys thereof are disposed on the passivation layer 180. The pixel electrodes 191 include a plurality of pairs of the first and second pixel electrode 191a and 191b.

As shown in FIG. 6, an entire outer shape of one pixel electrode 191 is a quadrangle, and the first pixel electrode 191a and the second pixel electrode 191b are engaged with each other. That is, portions of the first pixel electrode 191a and the second pixel electrode 191b alternate with each other in the longitudinal and transverse directions. The first pixel electrode 191a and the second pixel electrode 191b are disposed substantially symmetrically with respect to an imaginary transverse central line, and are respectively divided into two sub-regions, e.g., an upper sub-region and a lower sub-region.

The first pixel electrode 191a includes a lower stem 191a1 and an upper stem 191a3, and a plurality of first branches 191a2 and a plurality of second branches 191a4 extending from the lower stem 191a1 and the upper stem 191a3, respectively. The second pixel electrode 191b includes a lower stem 191b1 and an upper stem 191b3, and a plurality of the third branches 191b2 and a plurality of fourth branches 191b4 extending from the lower stem 191b1 and the upper stem 191b3, respectively.

The lower stem 191a1 and the upper stem 191a3 of the first pixel electrode 191a are disposed on the left side and the right side of one pixel electrode, respectively, and the lower stem 191b1 and the upper stem 191b3 of the second pixel electrode 191b are disposed on the right side and the left side of one pixel electrode, respectively.

The angle of the plurality of branches 191a2, 191a4, 191b2 and 191b4 of the first pixel electrode 191a and the second pixel electrode 191b, with respect to the transverse center line, may be about 45 degrees.

The branches 191a2, 191a4, 191b2 and 191b4 of the first pixel electrode 191a and the second pixel electrode 191b engage with each other with a predetermined interval therebetween and are alternately disposed, thereby forming a pectinated pattern. In an exemplary embodiment, the interval between the branches 191a2, 191a4, 191b2 and 191b4 of the first pixel electrode 191a and the second pixel electrode 191b less than or equal to about 30 micrometers (μm). The interval between adjacent branches 191a2, 191a4, 191b2 and 191b4 may be taken perpendicular to a longitudinal direction of the branches 191a2, 191a4, 191b2 and 191b4.

The branches 191a2, 191a4, 191b2 and 191b4 of the first pixel electrode 191a and the second pixel electrode 191b engage with each other and are alternately disposed, thereby forming a pectinated pattern. A pixel region includes a low gray region, in which the interval between the neighboring branches is wide, and a high gray region, in which the interval between the neighboring branches is narrow, and the high gray region is disposed substantially at the center of the pixel area and is enclosed by the low gray region. In an exemplary embodiment, in the case of the low gray region, in which the interval between the branches of the first pixel electrode 191a and the branches of the second pixel electrode 191b that are alternately disposed, is wide, the intensity of the electric field applied to the liquid crystal layer 3 between the branches of the first pixel electrode 191a and the branches of the second pixel electrode 191b is decreased such that a relative low gray is displayed although the same voltage is applied compared with the high gray region in which the interval between the neighboring branches is narrow. In the case of the high gray region, in which the interval between the branches of the first pixel electrode 191a and the branches of the second pixel electrode 191b that are alternately disposed, is narrow, the intensity of the electric field applied to the liquid crystal layer 3 between the branches of the first pixel electrode 191a and the branches of the second pixel electrode 191b is increased such that a relative high gray is displayed although the same voltage is applied compared with the low gray region in which the interval between the neighboring branches is wide. In an alternative exemplary embodiment, the inclination angle of the liquid crystal molecules 31 of the liquid crystal layer 3 may vary and different luminance with respect to one image information set may be displayed by varying the interval between the first pixel electrode 191a and the second pixel electrode 191b in one pixel. Further, an image viewed from a side of the liquid crystal display may be substantially similar to an image viewed from a front of the liquid crystal display by properly adjusting the interval between the branches of the first pixel electrode 191a and the second pixel electrode 191*b*. Therefore, in exemplary embodiment, side visibility is substantially improved and transmittance is substantially enhanced.

In the exemplary embodiment, a ratio of a total planar area of the low gray region and a total planar area of the high gray region may be in a range of about 4:1 to about 30:1. Also, the interval between the branches of the first pixel electrode 191*a* and the second pixel electrode 191*b* may be about 10 μm to about 20 μm, and more specifically about 10 μm to about 17 μm in the low gray region, and the interval between the branches of the first pixel electrode 191*a* and the second pixel electrode 191*b* may be about 3 μm to about 9 μm, and more specifically about 3 μm to about 7 μm in the high gray region.

A portion of the low gray region is disposed in a portion that is not enclosed by the stems 191*a*1, 191*a*3, 191*b*1, and 191*b*3 of the first pixel electrode 191*a* and the second pixel electrode 191*b* among the pixel outer portion of the liquid crystal display according to the exemplary embodiment illustrated in FIGS. 6 and 7 such that the portion of low gray region is disposed at the region where the magnitude of the horizontal electric field between the first pixel electrode 191*a* and the second pixel electrode 191*b* is relatively weak. Accordingly, a display quality deterioration that may be generated by the asymmetry of the direction of the horizontal electric field between the first pixel electrode 191*a* and the second pixel electrode 191*b* such as texture may be substantially reduced.

In an exemplary embodiment, the liquid crystal display may have an extension region, in which the intervals between the branches 191*a*2 and 191*a*4 of the first pixel electrode 191*a* and the branches 191*b*2 and 191*b*4 of the second pixel electrode 191*b* are extended. The intervals between the branches 191*a*2 and 191*a*4 of the first pixel electrode 191*a* and the branches 191*b*2 and 191*b*4 of the second pixel electrode 191*b* in the extension region may be about 20 μm to about 28 μm. In an exemplary embodiment, the extension region is disposed at the position where the liquid crystal molecules are irregularly moved in the pixel area such as a portion near the portion that is not enclosed by the stems 191*a*1, 191*a*3, 191*b*1 and 191*b*3 of the first pixel electrode 191*a* and the second pixel electrode 191*b* among the pixel outer part of the liquid crystal display or the gate line 121.

In such an embodiment, the liquid crystal molecules 31 disposed at the extension region are less influenced by the horizontal electric field generated between the branches 191*a*2 and 191*a*4 of the first pixel electrode 191*a* and the branches 191*b*2 and 191*b*4 of the second pixel electrode 191*b*. Accordingly, the liquid crystal molecules 31 disposed at the extension region are less influenced by the asymmetrical horizontal electric field, and the liquid crystal molecules 31 have a tendency to be in an initial vertical alignment state, such that the liquid crystal molecules may be effectively prevented from being irregularly slanted by external pressure. Accordingly, irregular movement of the liquid crystal molecules is effectively prevented from being diffused from the outer part of the pixel area to the inner part of the pixel area, and a singular point limited in the extension region is thereby prevented from being formed such that the quality deterioration of a large-sized display from the outer part of the pixel area to the inner part of the pixel area is effectively prevented.

However, the shape of the first pixel electrode 191*a* and the second pixel electrode 191*b* in one pixel of the liquid crystal display according to an exemplary embodiment of the present invention is not limited thereto, and all shapes of which at least portions of the first pixel electrode 191*a* and the second pixel electrode 191*b* are the same and are alternately disposed may be applied.

The first pixel electrode 191*a* of the first pixel PX1 is physically and electrically connected to the first drain electrode 175*a* via the contact hole 185*a*, thereby receiving a voltage transmitted through the voltage transmitting line 172 from the first drain electrode 175*a*. Also, the second pixel electrode 191*b* of the first pixel PX1 is physical and electrically connected to the second drain electrode 175*b* via the contact hole 185*b*, thereby receiving the first data voltage flowing in the first data line 171*a*. The first sub-pixel electrode 191*a* and the second sub-pixel electrode 191*b* form the liquid crystal capacitor Clc along with the liquid crystal layer 3 interposed therebetween to maintain the applied voltage after the first TFT and the second TFT are turned off.

The first pixel electrode 191*a* of the second pixel PX2 is connected to the second drain electrode 175*b* via the first contact hole 185*a*, thereby receiving the data voltage through the second data line 171*b*, and the second pixel electrode 191*b* of the second pixel PX2 is connected to the first drain electrode 175*a* via the second contact hole 185*b*, thereby receiving the voltage through the voltage transmitting line 172.

The first pixel electrode 191*a* of the third pixel PX3 is electrically connected to the first drain electrode 175*a* via the contact hole 185*a*, thereby receiving the voltage through the voltage transmitting line 172 from the first drain electrode 175*a*, and the second pixel electrode 191*b* of the third pixel PX3 is electrically connected to the second drain electrode 175*b* via the contact hole 185*b*, thereby receiving the third data voltage through the third data line 171*c*.

The wide second ends of the first drain electrode 175*a* and the second drain electrode 175*b* connected to the first sub-pixel electrode 191*a* and the second sub-pixel electrode 191*b* overlap the storage electrodes 133*a* and 133*b* via the gate insulating layer 140, thereby collectively defining the storage capacitor that reinforces the voltage maintaining capacity of the liquid crystal capacitor Clc.

In the first pixel PX1, the lower stem 191*a*1 of the first pixel electrode 191*a* is connected to the first connection conductor 135*a* via the contact hole 186*a*, and the upper stem 191*a*3 of the first pixel electrode 191*a* is connected to the first connection conductor 135*a* via the contact hole 186*b*, thereby receiving the voltage from the first drain electrode 175*a*.

In the first pixel PX1, the lower stem 191*b*1 of the second pixel electrode 191*b* is connected to the second connection conductor 135*a* via the contact hole 187*a*, and the upper stem 191*b*3 of the second pixel electrode 191*b* is connected to the second connection conductor 135*a* via the contact hole 187*b*, thereby receiving the voltage from the second drain electrode 175*b*. In an exemplary embodiment, the stems 191*a*1, 191*a*3, 191*b*1 and 191*b*3 of the second pixel PX2 and the third pixel PX3 receive the voltage through a connection substantially the same as the connection described with respect to the first pixel PX1.

A lower alignment layer (not shown) may be disposed on an inner surface of the display panel 100, and the lower alignment layer may be a vertical alignment layer. Although not shown, a polymer layer may be disposed on the lower alignment layer, and the polymer layer may include a polymer branch that is formed according to an initial alignment direction of the liquid crystal molecules 31. In an exemplary embodiment, the polymer layer may be formed by exposing and polymerizing a prepolymer such as a monomer, that is hardened by polymerization with light such as ultraviolet rays, and the alignment force of the liquid crystal molecules may be controlled according to the polymer branch.

Next, the upper panel 200 will be described.

A light blocking member 220 is disposed on a second insulation substrate 210 including transparent glass or plastic. The light blocking member 220 prevents light leakage between the pixel electrodes 191 and defines an opening region that faces the pixel electrodes 191.

A plurality of color filters 230 are disposed on the second substrate 210 and the light blocking member 220. The color filters 230 mostly exist within the area surrounded by the light blocking member 220, and may longitudinally extend along the columns of the pixel electrodes 191 in the longitudinal direction. The respective color filters 230 may express one of three primary colors of red, green and blue, or the primary colors of yellow, cyan, and magenta. Also, each pixel may represent a mixture color of the primary colors or white as well as the primary colors.

An overcoat 250 is disposed on the color filters 230 and the light blocking member 220. The overcoat 250 may include an inorganic or organic insulator, and reduce or effectively prevents exposure of the color filters 230 and provides a planarized surface. In an alternative exemplary embodiment, the overcoat 250 may be omitted.

An upper alignment layer (not shown) is disposed on the inner surface of the display panel 200, and the upper alignment layer may be a vertical alignment layer. Although not shown, a polymer layer may also be disposed on the upper alignment layer. In an exemplary embodiment, the polymer layer may be formed by exposing a prepolymer such as a monomer, that is hardened by polymerization with light such as ultraviolet rays, such that the alignment force of the liquid crystal molecules may be controlled. The polymer layer may include a polymer branch that is formed according to the initial alignment direction of the liquid crystal molecule.

At least one polarizer (not shown) may be provided on the outer surface of the display panels 100 and 200.

The liquid crystal layer 3 is disposed between the lower display panel 100 and the upper display panel 200, and includes liquid crystal molecules 31 that have positive dielectric anisotropicity, and the liquid crystal molecules 31 may be aligned such that longitudinal axes thereof are substantially perpendicular to the surfaces of two display panels 100 and 200 in a state in which there is no electric field.

When the first pixel electrode 191a and the second pixel electrode 191b are applied with different voltages, an electric field substantially parallel to the surfaces of the display panels 100 and 200 is generated. Thus, the liquid crystal molecules of the liquid crystal layer 3 that are initially aligned perpendicular to the surfaces of the display panels 100 and 200 are rearranged in response to the electric field such that the longitudinal axes thereof are declined parallel to the direction of the electric field, and the change degree of the polarization of the light incident to the liquid crystal layer 3 is different according to the declination degree of the liquid crystal molecules. The change of the polarization appears as a change of the transmittance by the polarizer, and thereby the liquid crystal display displays the images.

As described above, the liquid crystal molecules 31 that are vertically aligned are used such that the contrast ratio of the liquid crystal display may be improved and the wide viewing angle may be realized. Furthermore, when the liquid crystal molecules 31 that are aligned perpendicular to the display panel 100 and 200 are used, the contrast ratio of the liquid crystal display may be improved and the wide viewing angle may be realized. In an exemplary embodiment, the liquid crystal molecules 31 that have positive dielectric anisotropicity have greater dielectric anisotropicity and a lower rotation viscosity as compared to the liquid crystal molecules 31 that have negative dielectric anisotropicity, and a response speed is thereby substantially increased.

Also, in an exemplary embodiment of the liquid crystal display, the branches of the first pixel electrode 191a and the second pixel electrode 191b engage with each other and are alternately disposed, thereby forming a pectinated pattern. A low gray region is formed where the interval between the neighboring branches is wide, and a high gray region is formed where the interval between the neighboring branches is narrow, and the high gray region is disposed at the center of the pixel area and is enclosed by the low gray region. Accordingly, the inclination angle of the liquid crystal molecules 31 of the liquid crystal layer 3 may vary and different luminance with respect to one image information set may be displayed by varying the interval between the first pixel electrode 191a and the second pixel electrode 191b in one pixel. Further, an image viewed from the side of the liquid crystal display may be substantially similar to an image viewed from the front of the liquid crystal display by properly adjusting the interval between the branches of the first pixel electrode 191a and the second pixel electrode 191b. Therefore, in an exemplary embodiment, side visibility is substantially improved and transmittance is substantially enhanced.

The low gray region is disposed in a portion that is not enclosed by the stems 191a1, 191a3, 191b1 and 191b3 of the first pixel electrode 191a and the second pixel electrode 191b among the pixel outer portion of the liquid crystal display in FIGS. 6 and 7 such that the region where the magnitude of the horizontal electric field between the first pixel electrode 191a and the second pixel electrode 191b is relatively weak is disposed. Accordingly, the display quality deterioration that can be generated by the asymmetry of the direction of the horizontal electric field between the first pixel electrode 191a and the second pixel electrode 191b such as texture may be reduced.

In an exemplary embodiment, the liquid crystal display has the extension region where the interval between portions of the branches 191a2 and 191a4 of the first pixel electrode 191a, and between portions of the branches 191b2 and 191b4 of the second pixel electrode 191b are extended. The interval between the portions of the branches 191a2 and 191a4 of the first pixel electrode 191a and the interval between the portions of the branches 191b2 and 191b4 of the second pixel electrode 191b in the extension region may be about 20 μm to about 28 μm. In an exemplary embodiment, the extension region is disposed at the position where the liquid crystal molecules are irregularly moved in the pixel area such as a portion near the portion that is not enclosed by the stems 191a1, 191a3, 191b1 and 191b3 of the first pixel electrode 191a and the second pixel electrode 191b among the pixel outer part of the liquid crystal display or near the gate line 121.

In such an embodiment, the liquid crystal molecules 31 disposed at the extension region are less influenced by the horizontal electric field generated between the branches 191a2 and 191a4 of the first pixel electrode 191a and the branches 191b2 and 191b4 of the second pixel electrode 191b. Accordingly, the liquid crystal molecules 31 disposed at the extension region are less influenced by the asymmetry horizontal electric field, and the liquid crystal molecules 31 have a tendency to be in the initial vertical alignment state, such that the liquid crystal molecules may be prevented from being irregularly slanted by external pressure. Accordingly, the irregular movement of the liquid crystal molecules is prevented from being diffused from the outer part of the pixel area to the inner of the pixel area, and the singular point limited in the extension region is prevented from being formed such that the large-sized display quality deterioration from the outer part of the pixel area to the inner part of the pixel area may be prevented.

Figure 8A:
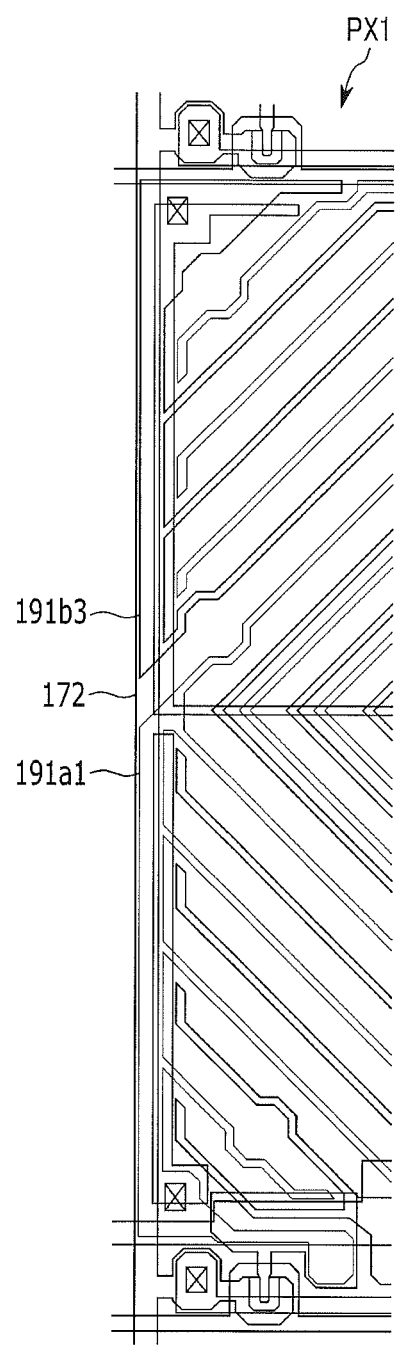
FIG. 8A to FIG. 8C are partial top plan views of an exemplary embodiment of a liquid crystal display according to the present invention.
Figure 8B:
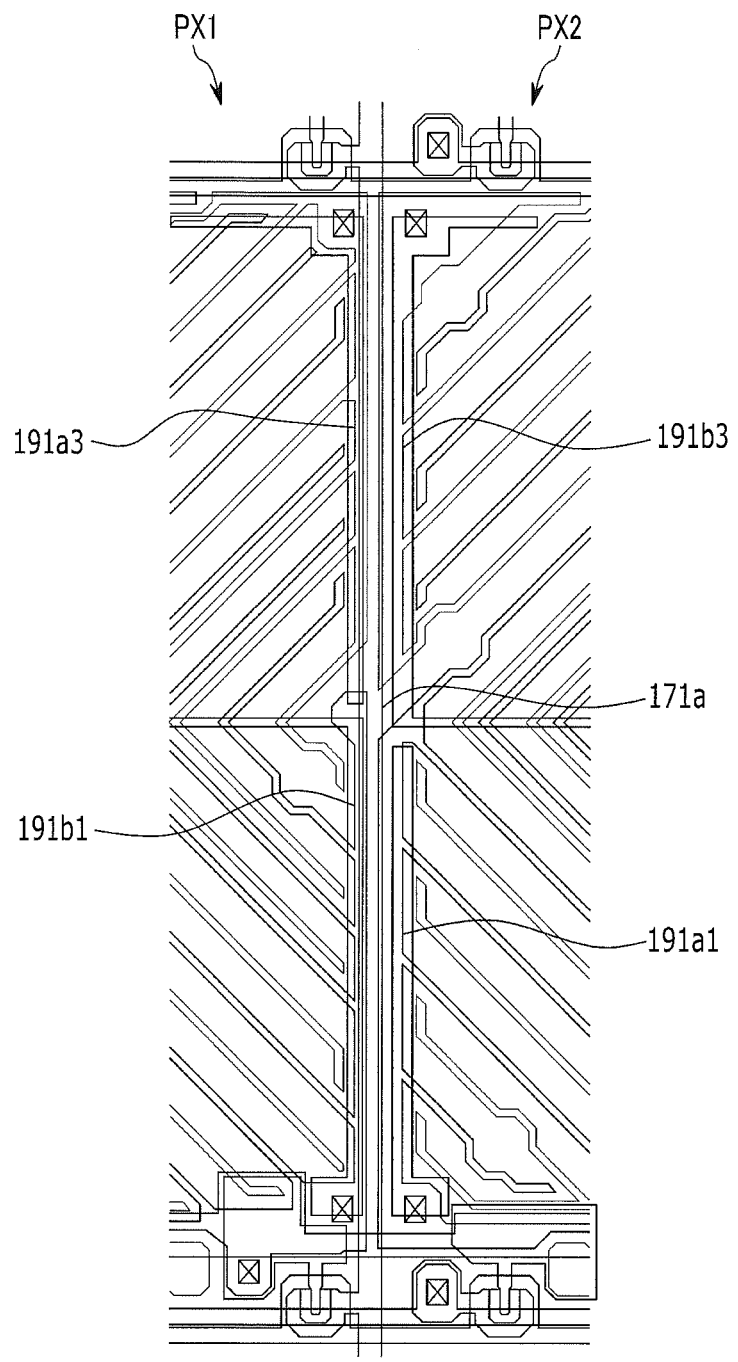
Figure 8C:
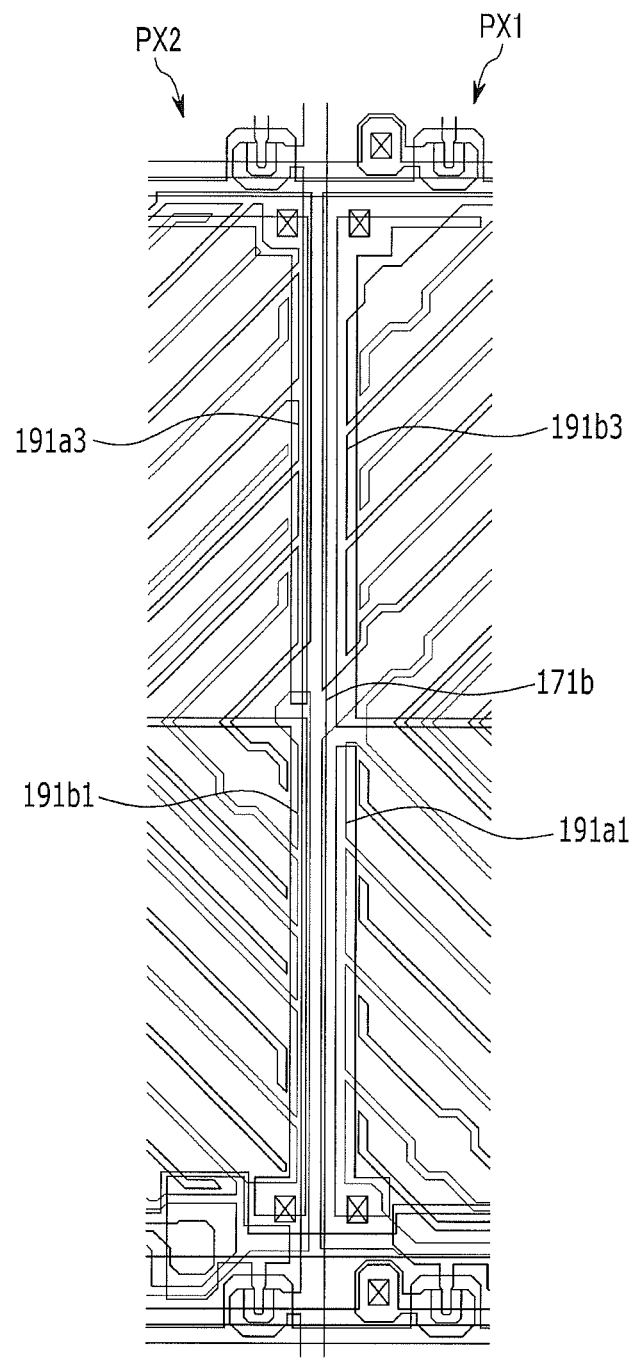

In such an embodiment, the voltage transmitting line 172 is covered by the stem of the pixel electrodes 191. In addition to, the stems of the pixel electrodes 191 applied with the data voltages through the data lines are disposed opposite to each other with respect to the first data line 171a and the second data line 171b and the stems of the pixel electrodes applied with the voltage through the voltage transmitting line are disposed opposite to each other with respect to the first data line 171a and the second data line 171b. This will be described with reference to FIGS. 8A to 8C. FIGS. 8A to 8C are partial top plan views of an exemplary embodiment of a liquid crystal display according to the present invention.

Referring to FIG. 8A, at least a portion of the voltage transmitting line 172 of the liquid crystal display is covered by the stems 191a1 and 191b3 of the pixel electrodes 191a and 191b in the top plan view. In an exemplary embodiment, the stems 191a1 and 191b3 of the pixel electrodes 191a and 191b covering the voltage transmitting line 172 may cover at least about two third of the voltage transmitting line 172.

As described above, the voltage transmitting line 172 that transmits the voltage having the constant magnitude is covered by the pixel electrodes 191a and 191b such that the electric field may not be generated between the voltage transmitting line 172 and the pixel electrodes 191a and 191b, and the voltage distortion of the pixel electrodes 191a and 191b and the signal delay of the voltage transmitted by the voltage transmitting line 172 is thereby effectively prevented. Also, the capacitance caused by the overlapping of the pixel electrodes 191a and 191b and the voltage transmitting line 172 functions as a storage capacitor such that the storage capacitance of the liquid crystal display is substantially increased. Therefore, any electric fields caused by the signal of the voltage transmitting line 172 may be prevented and storage capacitors may be increased.

Next, referring to FIGS. 8B and 8C, the stems of the pixel electrodes applied with the data voltage through the data lines are disposed opposite to each other at the right and left sides of the data line 171b and 171b of the liquid crystal display, and the stems of the pixel electrodes applied with the voltage through the voltage transmitting line are disposed opposite to each other. Referring to FIG. 8B, the stem 191b1 of the second pixel electrode 191b of the first pixel PX1 applied with the data voltage and the stem 191a1 of the first pixel electrode 191a of the second pixel PX2 applied with the data voltage are disposed to opposite to each other at the right and left sides of the first data line 171a, which is disposed therebetween, and the stem 191a3 of the first pixel electrode 191a of the first pixel PX1 applied with the voltage from the voltage transmitting line 172 and the stem 191b3 of the second pixel electrode 191b of the second pixel PX2 applied with the voltage from the voltage transmitting line 172 are disposed opposite to each other. Also, referring to FIG. 8C, the stems of the pixel electrodes applied with the data voltage through the data lines connected to the second and third pixels PX2 and PX3 are disposed opposite to each other with respect to the second data line 171b, which is disposed therebetween, and the stems of the pixel electrodes applied with the voltage through the voltage transmitting line are disposed opposite to each other, at the right and left sides of the second data line 171b.

In such an embodiment, the stems of the pixel electrodes applied with the data voltage through the data line are disposed opposite to, e.g., facing, each other and the stems of the pixel electrodes applied with the voltage through the voltage transmitting line are disposed opposite to each other at left and right sides of the data lines 171a and 171b such that crosstalk that may be generated by the deviation of the parasitic capacitance due to the data lines 171a and 171b is effectively prevented from being generated.

Figure 9:
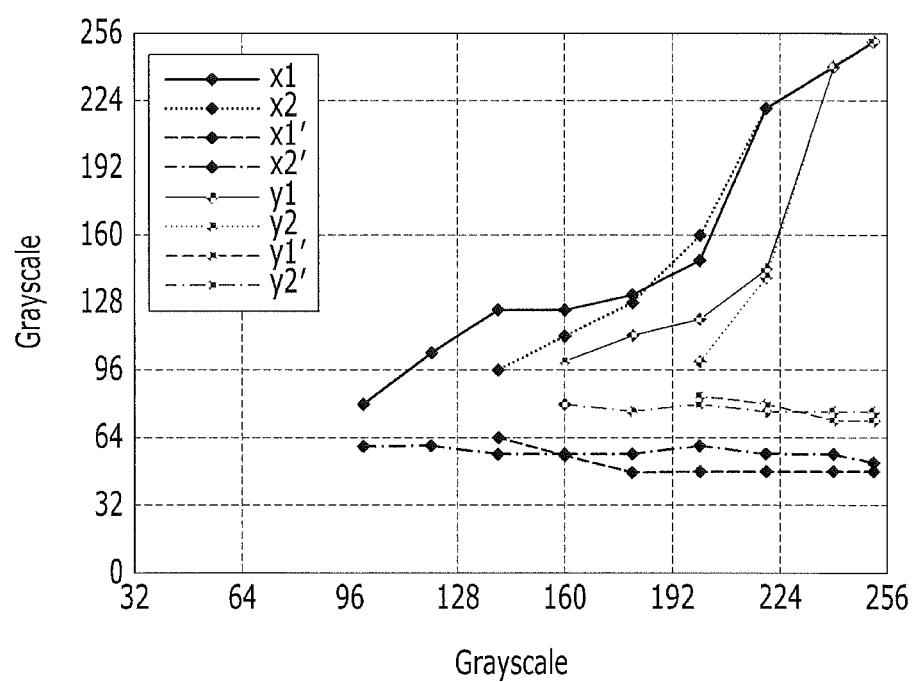
FIG. 9 is a graph of grayscale measurement results showing display quality of an exemplary embodiment of the liquid crystal display.
Figure 10:
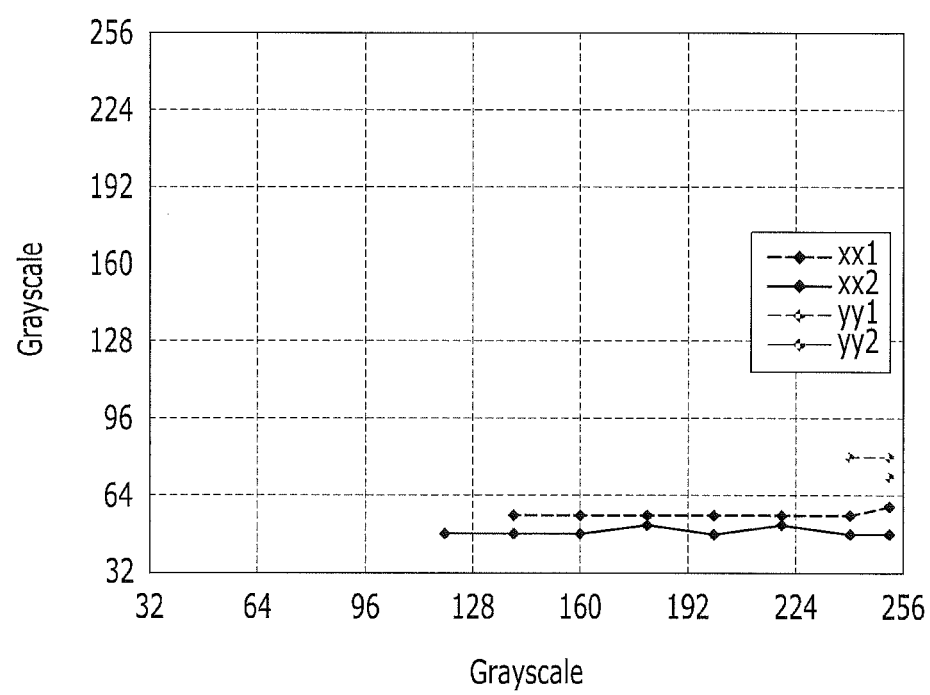
FIG. 10 is a graph of grayscale measurement results showing display quality of an exemplary embodiment of the liquid crystal display.

Next, display quality of an exemplary embodiment of a liquid crystal display of the present invention will be described with reference to FIGS. 9 and 10. FIG. 9 is a graph of grayscale measuring results showing display quality of an exemplary embodiment of the liquid crystal display, and FIG. 10 is a graph grayscale measuring results showing display quality of an exemplary embodiment of the liquid crystal display.

In an exemplary experiment, grayscales of case 1 and case 2 were measured. In the exemplary experiment, case 1 is a conventional liquid crystal display, in which the voltage transmitting line 172 is not covered by the stems of the pixel electrodes, and the branches of the pixel electrodes applied with the data voltage and the branches of the pixel electrodes applied with the voltage from the voltage transmitting line are disposed to be symmetrical at both side of the data lines 171a and 171b, and case 2 is an exemplary embodiment of the liquid crystal display, in which the voltage transmitting line 172 is covered by the stems of the pixel electrodes, and the stems of the pixel electrodes applied with the data voltage through the data lines and the stems of the pixel electrodes applied with the voltage through the voltage transmitting line are disposed to be symmetrical with respect to the data lines disposed therebetween, e.g., to face each other at both sides of the data lines 171a and 171b. Also, for case 1 and case 2, in the low gray region where an interval between the neighboring branches of the first pixel electrode 191a and the second pixel electrode 191b is relatively wide and the high gray region where an interval between the neighboring branches is relatively narrow. In the exemplary experiment, the intervals between the branches of the first pixel electrode 191a and the second pixel electrode 191b are set to be about 11.5 μm and 5 μm, respectively, or the intervals between the branches of the first pixel electrode 191a and the second pixel electrode 191b are set to be about 11.5 μm and about 6.5 μm, respectively. The remaining conditions are substantially the same.

In the exemplary experiment, the liquid crystal displays prepare according to case 1 and case 2 is pressed with a predetermined pressure and it is determined whether stains due to the pressure are recognized for each grayscale, and the results thereof are shown in the graph of FIG. 9. Also, the liquid crystal display is hit using an apparatus having a constant weight and then it is determined whether stains caused by the pressure for each grayscale are recognized, and the results thereof are shown in FIG. 10.

In FIG. 9, lines x1 and x2 are curves showing the grayscales when the stains due to the pressure are recognized, and lines x1' and x2' are curves showing the grayscales when the stains due to the pressure disappear in case 1. Also, lines y1 and y2 are curves showing the grayscales when the stains due to the pressure are recognized, and lines y1' and y2' are curves showing the grayscales when the stains due to the pressure disappear in case 2.

Referring to FIG. 9, when comparing the lines x1 and x2 and the lines y1 and y2 and the lines x1' and x2' and the lines y1' and y2' by comparing grayscale values corresponding to a same X-axis, it is confirmed that the stain by the pressure is recognized at a lower grayscale in case 2 than in case 1. As shown in FIG. 9, since the stains caused by the same pressure are recognized at a lower grayscale in case 2 of an exemplary embodiment of the liquid crystal display, compared with case 1 of the conventional liquid crystal display, a user may recognize substantially less stains in an exemplary embodiment according to the present invention.

Also, in case 1 of the conventional liquid crystal display, compared with case 2 of an exemplary embodiment of the liquid crystal display, it is confirmed that the stains caused by the pressure are more continuously recognized at a low grayscale value. In one exemplary embodiment, for example, the stains caused by the pressure are recognized at a grayscale of less than 160 in case 1, while the stains caused by the pressure are not recognized at a grayscale of less than 160 in case 2. By this, it may be confirmed that the stains due to the pressure are not generated in the low grayscale in case 2 of the liquid crystal display according to the exemplary embodiment of the present invention compared with case 1 of the conventional liquid crystal display.

Also, when comparing the lines x1' and x2' and the lines y1' and y2', by comparing grayscale values corresponding to a same X-axis, it is confirmed that the stains caused by the pressure disappear in the upper grayscales in case 2. Accordingly, it is confirmed that the stains caused by the pressure more quickly disappear in case 2 compared with case 1 of the conventional liquid crystal display.

In FIG. 10, the lines xx1 and xx2 are curves showing grayscales when the stains caused by an impact, e.g., by being hit, are recognized in case 1 of the conventional liquid crystal display, and the lines yy1 and yy2 are curves showing grayscales when the stains caused by the impact are recognized in case 2 of an exemplary embodiment of the liquid crystal display.

Referring to FIG. 10, it is confirmed that the stains caused by the impact appear as a lower grayscale in case 2 than in case 1. Accordingly, it is confirmed that the stains caused by the impact are less generated at low grayscales in case 2 compared with case 1.

As described above, in an exemplary embodiment of the liquid crystal display, when compared with a conventional liquid crystal display, it is confirmed that the deterioration of the display quality due to external pressure is substantially decreased, and thereby display quality thereof is substantially improved.

The arrangements of signal lines and the pixels and the driving methods thereof of the liquid crystal displays according to the above-described exemplary embodiments may be applied to a pixel of all shapes including a first pixel electrode and a second pixel electrode of which at least portions are disposed in a same layer and are alternately disposed.

While this invention has been described in connection with what is presently considered to be practical exemplary embodiments, it is to be understood that the invention is not limited to the exemplary embodiments described herein, but, on the contrary, is intended to include various modifications and equivalent arrangements within the spirit and scope of the appended claims.

What is claimed is:

1. A liquid crystal display comprising:
a first substrate;
a second substrate disposed opposite to the first substrate;
a liquid crystal layer interposed between the first substrate and the second substrate and including liquid crystal molecules;
a gate line disposed on the first substrate, wherein the gate line transmits a gate signal;
a plurality of data lines disposed on the first substrate, wherein the plurality of data lines transmits a first voltage;
a voltage transmitting line disposed on the first substrate, wherein the voltage transmitting line transmits a second voltage having one of two different voltages;
a plurality of pixels respectively comprising a first pixel electrode disposed on the first substrate; and a second pixel electrode disposed on the first substrate and spaced apart from the first pixel electrode,
wherein one of the first pixel electrode and the second pixel electrode is applied with the first voltage through one of the plurality of data lines, the other of the first pixel electrode and the second pixel electrode is applied with a second voltage through the voltage transmitting line,
wherein each of the first pixel electrode and the second pixel electrode includes a stem and a plurality of branches extending from the stem, and the branches of the first pixel electrode and the branches of the second pixel electrode are alternately disposed, and
the plurality of pixels includes a first pixel and a second pixel neighboring each other,
a data line of the plurality of data lines is disposed between the first pixel and the second pixel,
the stems of the first pixel electrode and the second pixel electrode of the first pixel include a first portion overlapping the data line disposed between the first pixel and the second pixel,
the stems of the first pixel electrode and the second pixel electrode of the second pixel include a second portion overlapping the data line disposed between the first pixel and the second pixel,
the first portion and the second portion are applied with the first voltage and are disposed opposite to each other with respect to the data line disposed between the first pixel and the second pixel, and
the voltage transmitting line is connected to three contiguous pixels of the plurality of pixels connected to the gate line.

2. The liquid crystal display of claim 1, wherein
the stems of the first pixel electrode and the second pixel electrode of the first pixel include a third portion overlapping the data line disposed between the first pixel and the second pixel,
the stems of the first pixel electrode and the second pixel electrode of the second pixel include a fourth portion overlapping the data line disposed between the first pixel and the second pixel, and
the third portion and the fourth portion are applied with the second voltage and are disposed opposite to each other with respect to the data line disposed between the first pixel and the second pixel.

3. The liquid crystal display of claim 2, wherein
wherein the stems of the first pixel electrode and the second pixel electrode overlap at least a portion of the voltage transmitting line.

4. The liquid crystal display of claim 3, wherein
the stems of the first pixel electrode and the second pixel electrode cover at least two thirds of the voltage transmitting line.

5. The liquid crystal display of claim 4, further comprising:
a first region including a first interval between the branches of the first pixel electrode and adjacent branches of the second pixel electrode; and
a second region including a second interval between the branches of the first pixel electrode and the adjacent branches of the second pixel electrode,
wherein the first interval is greater than the second interval, and
wherein the first region includes a region where the stems of the first and second pixel electrodes are not disposed at an edge of a pixel area.

6. The liquid crystal display of claim 5, wherein the liquid crystal molecules of the liquid crystal layer are substantially vertically aligned when no electric field is applied to the liquid crystal layer.

7. The liquid crystal display of claim 6, wherein the first pixel electrode and the second pixel electrode are applied with voltages having different polarities.

8. The liquid crystal display of claim 7, further comprising:
an extension region including a third interval between the branches of the first pixel electrode and the adjacent branches of the second pixel electrode, wherein the third interval is greater than the first interval in the first region.

9. The liquid crystal display of claim 1, wherein
wherein the stems of the first pixel electrode and the second pixel electrode overlap at least a portion of the voltage transmitting line.

10. The liquid crystal display of claim 9, wherein the stems of the first pixel electrode and the second pixel electrode cover at least two thirds of the voltage transmitting line.

11. The liquid crystal display of claim 10, further comprising:
a first region including a first interval between the branches of the first pixel electrode and adjacent branches of the second pixel electrode; and
a second region including a second interval between the branches of the first pixel electrode and the adjacent branches of the second pixel electrode,
wherein the first interval is greater than the second interval, and
wherein the first region includes a region where the stems of the first pixel electrode and the second pixel electrode are not disposed at an edge of a pixel area.

12. The liquid crystal display of claim 11, wherein the liquid crystal molecules of the liquid crystal layer are substantially vertically aligned when no electric field is applied to the liquid crystal layer.

13. The liquid crystal display of claim 12, wherein the first pixel electrode and the second pixel electrode are applied with voltages having different polarities.

14. The liquid crystal display of claim 13, further comprising:
an extension region including a third interval between the branches of the first pixel electrode and the adjacent branches of the second pixel electrode, wherein the third interval is greater than the first interval in the first region.

15. The liquid crystal display of claim 1, further comprising:
a first region including a first interval between the branches of the first pixel electrode and adjacent branches of the second pixel electrode; and
a second region including a second interval between the branches of the first pixel electrode and the adjacent branches of the second pixel electrode,
wherein the first interval is greater than the second interval, and
the first region includes a region where the stems of the first pixel electrode and the second pixel electrode are not disposed at an edge of a pixel area.

16. The liquid crystal display of claim 15, wherein the liquid crystal molecules of the liquid crystal layer are substantially vertically aligned when no electric field is applied to the liquid crystal layer.

17. The liquid crystal display of claim 16, wherein the first pixel electrode and the second pixel electrode are applied with voltages having different polarities.

18. The liquid crystal display of claim 17, further comprising:
an extension region including a third interval between the branches of the first pixel electrode and the adjacent branches of the second pixel electrode, wherein the third interval is greater than the first interval in the first region.

19. The liquid crystal display of claim 1, wherein the liquid crystal molecules of the liquid crystal layer are substantially vertically aligned when no electric field is applied to the liquid crystal layer.

20. The liquid crystal display of claim 19, wherein the first pixel electrode and the second pixel electrode are applied with voltages having different polarities.

21. The liquid crystal display of claim 20, further comprising:
a first region including a first interval between the branches of the first pixel electrode and adjacent branches of the second pixel electrode; and
a second region including a second interval between the branches of the first pixel electrode and the adjacent branches of the second pixel electrode; and
an extension region including a third interval between the branches of the first pixel electrode and the adjacent branches of the second pixel electrode,
wherein the first interval is greater than the second interval, and
wherein the third interval is greater than the first interval in the first region.

22. The liquid crystal display of claim 1, further comprising:
a first region including a first interval between the branches of the first pixel electrode and adjacent branches of the second pixel electrode; and
a second region including a second interval between the branches of the first pixel electrode and the adjacent branches of the second pixel electrode; and
an extension region including a third interval between the branches of the first pixel electrode and the adjacent branches of the second pixel electrode,
wherein the first interval is greater than the second interval, and
wherein the third interval is greater than the first interval in the first region.

23. The liquid crystal display of claim 1, wherein the second voltage has a polarity that is changed per frame.

24. The liquid crystal display of claim 1,
wherein the plurality of further includes a third pixel neighboring the second pixel, wherein each of the first pixel, the second pixel, and the third pixel comprises a first thin film transistor and a second thin film transistor and has a first contact hole and a second contact hole, wherein the first pixel electrodes of the first pixel, the second pixel, and the third pixel are connected to the first thin film transistors through the first contact holes, and wherein the first contact hole is disposed in a first side of the first thin film transistor in the first pixel and the third pixel and the first contact hole is disposed in a second side opposite to the first side of the first thin film transistor in the second pixel.

25. The liquid crystal display of claim 24, wherein the second pixel electrodes of the first pixel, the second pixel, and the third pixel are connected to the second thin film transistors through the second contact holes, and wherein the second contact hole is disposed in one side of the second thin film transistor in the first pixel and the third pixel and the second contact hole is disposed in the opposite side of the second thin film transistor in the second pixel.

26. The liquid crystal display of claim 24, wherein the first contact hole is disposed on a first drain electrode of the first thin film transistor.

27. The liquid crystal display of claim 26, wherein the second contact hole is disposed on a second drain electrode of the second thin film transistor.

28. The liquid crystal display of claim 27, wherein at least one of the first drain electrode and the second drain electrode form a storage capacitor by overlapping a storage electrode.

* * * * *

UNITED STATES PATENT AND TRADEMARK OFFICE
CERTIFICATE OF CORRECTION

| | |
|---|---|
| PATENT NO. | : 9,715,151 B2 |
| APPLICATION NO. | : 13/241477 |
| DATED | : July 25, 2017 |
| INVENTOR(S) | : Mee Hye Jung et al. |

It is certified that error appears in the above-identified patent and that said Letters Patent is hereby corrected as shown below:

On the Title Page

Item (73) Assignee: Delete "SAMSUNG ELECTRONICS CO., LTD., Gyeonggi-Do (KR)"

Signed and Sealed this
Nineteenth Day of February, 2019

Andrei Iancu
*Director of the United States Patent and Trademark Office*